United States Patent [19]
Thumim

[11] 3,883,741
[45] May 13, 1975

[54] SCINTILLATION COUNTER, MAXIMUM GAMMA ASPECT
[75] Inventor: Arnold David Thumim, Chicago, Ill.
[73] Assignee: Packard Instrument Company, Inc., Downers Grove, Ill.
[22] Filed: July 27, 1973
[21] Appl. No.: 383,085

[52] U.S. Cl. .............................. 250/328; 250/361
[51] Int. Cl. .............................................. G01t 7/08
[58] Field of Search ................................... 250/328

[56] References Cited
UNITED STATES PATENTS
3,198,948   8/1965   Olson ................................ 250/328

Primary Examiner—James W. Lawrence
Assistant Examiner—Davis L. Willis
Attorney, Agent, or Firm—Wolfe, Hubbard, Leydig, Voit & Osann, Ltd.

[57] ABSTRACT

A scintillation counter, particularly for counting gamma ray photons, includes a massive lead radiation shield surrounding a sample-receiving zone. The shield is disassembleable into a plurality of segments to allow facile installation and removal of a photomultiplier tube assembly, the segments being so constructed as to prevent straight-line access of external radiation through the shield into radiation-responsive areas. Provisions are made for accurately aligning the photomultiplier tube with respect to one or more sample-transmitting bores extending through the shield to the sample receiving zone. A sample elevator, used in transporting samples into the zone, is designed to provide a maximum gamma-receiving aspect to maximize the gamma detecting efficiency.

3 Claims, 12 Drawing Figures

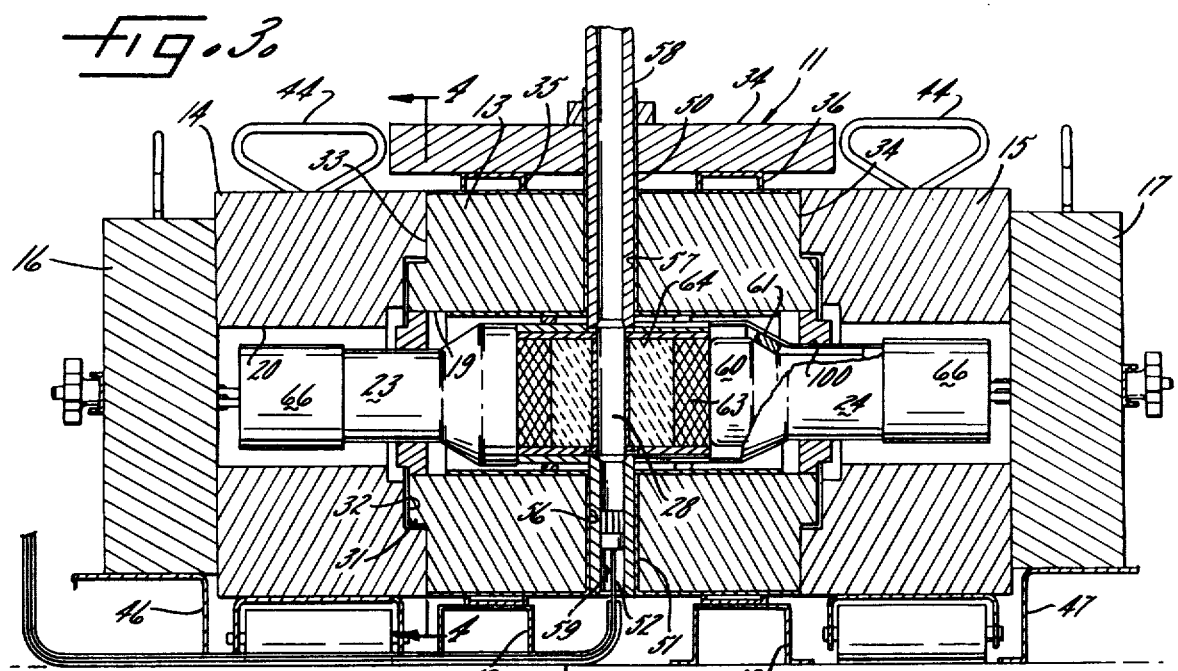
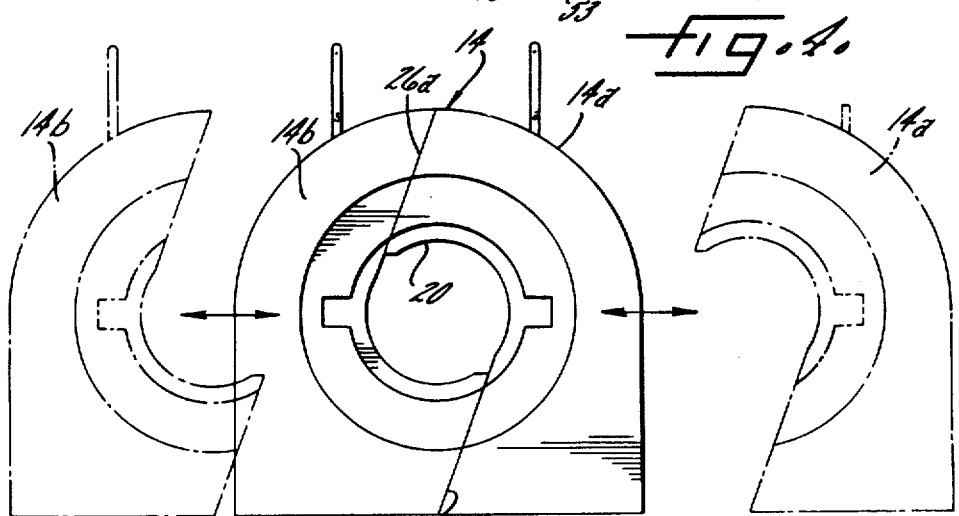
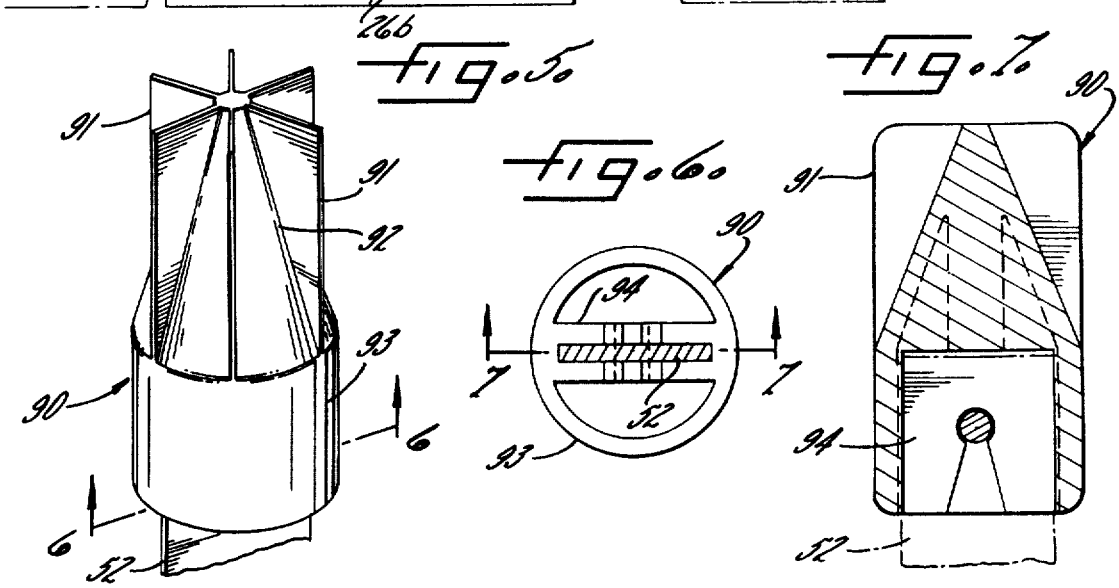

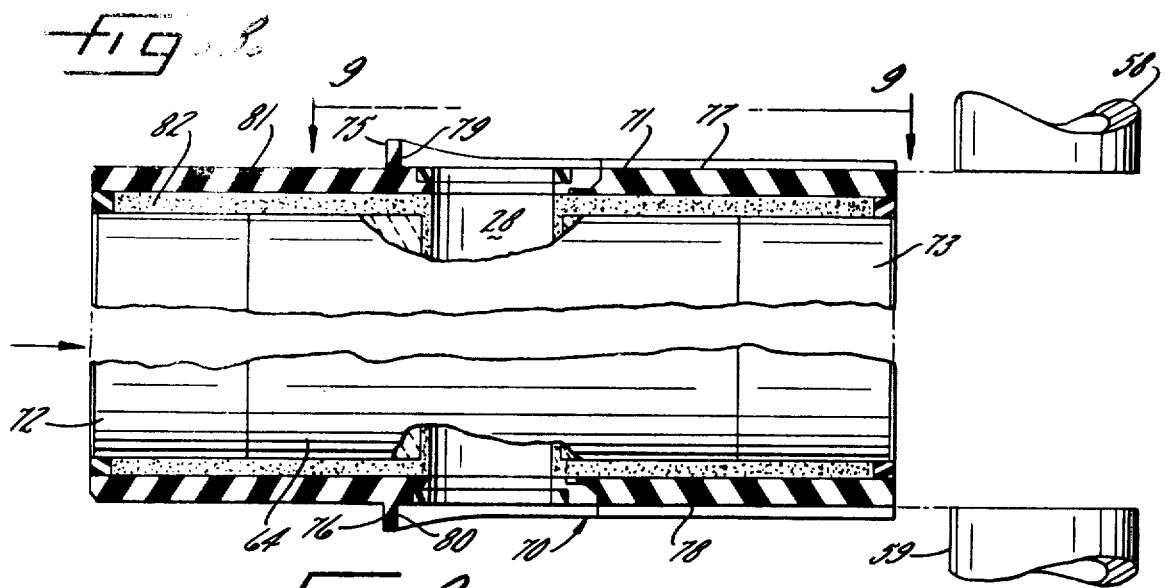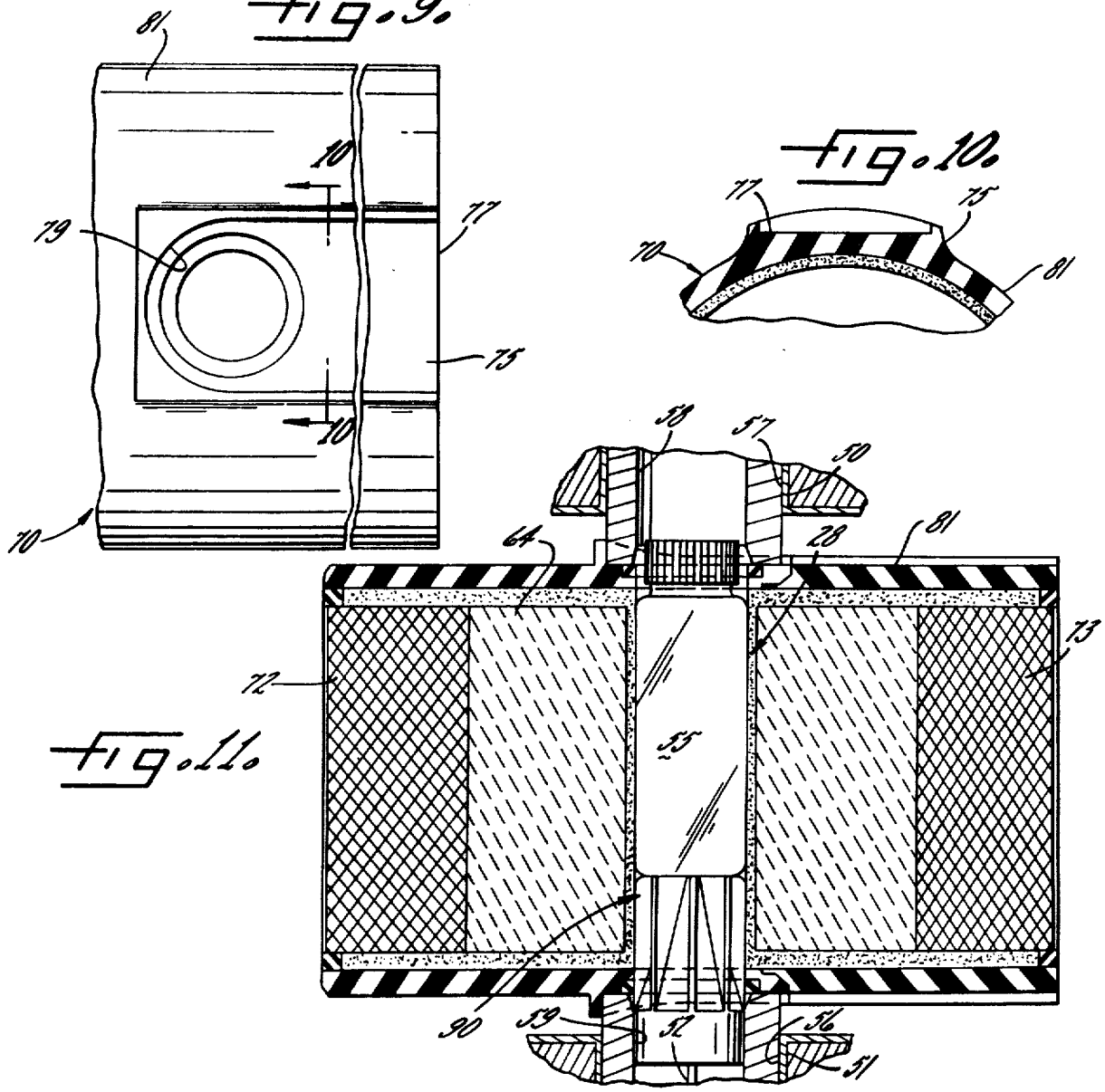

SCINTILLATION COUNTER, MAXIMUM GAMMA ASPECT

CROSS REFERENCE TO RELATED APPLICATION

1. Robert E. Olson and Arnold David Thumim application Ser. No. 388,097, filed July 27, 1973 entitled "Scintillation Counter; Segmented Shield."

2. Robert E. Olson application Ser. No. 383,061, filed July 27, 1973 entitled "Scintillation Counter; Photomultiplier Tube Alignment."

3. Frank application Ser. No. 241,987, filed Apr. 7, 1972 entitled "Elevator Mechanism for Scintillation Detectors and the Like.".

BACKGROUND OF THE INVENTION

This invention relates to apparatus for the measurement of radioactivity, and more particularly concerns improved scintillation counting equipment.

The detection and measurement of radioactivity by the use of scintillation counters is conducted routinely in many laboratories. Scintillation counting equipment is commercially available, and is capable of unusual precision and accuracy. Nonetheless, the fact that many radionuclide samples are of low activity presents serious problems in the practical conduct of scintillation counting.

One of the earliest-recognized problems is background radiation, which occurs chiefly from cosmic sources, but may be present as a result of normal radioactivity of many natural elements, from luminous wristwatch dials, and the like. This background radioactivity, in the case of samples which themselves have little radio activity, must be excluded to the fullest extent possible from the sample counting zone.

Conventionally, the sample counting or sample receiving zone is encased within a massive lead radiation shield, which also encases a photomultiplier tube assembly, that is, an electron multiplier tube having a photoelectric cathode which is capable of responding to very low light levels. Ideally, the shield excludes all external radiation, so that the photomultiplier tube will respond only to light scintillations produced by interaction of radiation from the sample with a scintillator material present in or near the sample receiving zone.

However, because the shield is usually of massive thickness, it is extremely heavy; shields of several hundred pounds are not uncommon. Yet the shield must include provision for the installation and removal of the photomultiplier tube. However, the parting surface of adjacent shield segments provides an essentially unobstructed route for external radiation to enter the sample receiving zone or other portions of the counter where they could produce a false count in the event the segments do not match perfectly. Perfect matching of heavy lead components is virtually impossible.

Accordingly, one object of the invention is to provide a radiation shield for scintillation counters, which shield is capable of disassembly into several segments that, when assembled, offer no straight-line access for external radiation to enter the sample receiving zone or other radiation-responsive areas. Another object is to provide such shield assembly where the segments are easily removable to allow installation and removal of photomultiplier tubes. Still another object is to provide a segmented lead radiation shield which is readily fabricated and is capable of repeated assembly and disassembly without impairing the background-isolating function of the shield.

An additional shield design problem arises from the fact that many scintillation counters must function automatically, with automatic introduction of a sample into the sample receiving zone and for automatic withdrawal of the sample at the end of a counting period. To avoid both mechanical jamming of the transporting equipment and to prevent the inducement of spurious light flashes as a result of a sample contacting the walls of the scintillation counter, it is essential that the transporting equipment and the photomultiplier tube assembly be accurately aligned with respect to each other. Because the sample transporting equipment and the photomultiplier tube assembly are essentially inaccessible once in the radiation shield, and because the problems caused by misalignment are so serious, it is important to provide an absolute system for aligning these components.

Accordingly, an additional object is to provide a scintillation counter apparatus in which the photomultiplier tube assembly is alignable both longitudinally and perpendicularly with respect to the sample transporting equipment. A further object is to provide an automatic scintillation counter which is free of the problems associated with misaligned sample transmitting elevators and the like.

Further, it is also desirable to maximize the aspect of the photomultiplier tube or tubes; in other words, to permit the tube to observe as much as possible of the sample. Radiation emitted from the sample which is prevented from access to a scintillator material, or scintillations which are prevented from access to a photomultiplier tube, inevitably produce a reduction in the detecting efficiency of the scintillation counter. Still another object of the invention is to improve the gamma ray detecting effeciency of scintillation spectrometer by maximizing the transmission of gamma rays from a gamma-active sample to a scintillator crystal.

SUMMARY OF INVENTION

The utility and versatility of scintillation counters are significantly improved in several respects.

First, the massive lead radiation shield is made in a plurality of segments which are disassembleable to allow installation and removal of a photomultiplier tube assembly. To prevent straight-line access of external radiation through the lead shield into the sample-receiving zone or into the scintillator(s) and photomultiplier(s), at least three major segments are employed; a sample-zone-surrounding segment having an axial cylindrical bore sufficiently large in diameter to receive a conventional photomultiplier tube assembly; an intermediate segment having an axial cylindrical bore coaxial with the first segment, the intermediate segment being longitudinally divided into two segments adapted for radial outward movement; and an end cap segment covering the bore of the intermediate segment.

In further keeping with this feature of the invention, the sample-zone-surrounding segment desirably has a protruding collar on its parting face, while the intermediate segment has a mating recess on its parting face. Also, the intermediate segment is advantageously divided by a pair of parallel parting surfaces, each tangential to the cylindrical bore of the intermediate segment.

Second, to render the photomultiplier tube assembly alignable both longitudinally and perpendicularly with respect to either a sample-conducting (sample-transferring) bore or a sample elevator bore, or both, a tube is slidably positioned in the bore or bores which has a flat end facing the sample-receiving zone. The photomultiplier tube assembly, which is normally rotatable as well as longitudinally movable in a bore within the radiation shield, is provided with a flat portion and a stop portion on either (or both) the top or bottom of the assembly. By registering the tube with the flat portion and stop portion, alignment of the photomultiplier tube assembly with respect to the bore or bores is assured.

Third, to obtain maximum aspect for gamma detection, the sample receiving zone is made substantially longer than the sample, and a sample elevator extension is provided which has a plurality of thin vertical sample-supporting members. The extension platform thus positions the sample above the bottom of the sample receiving zone, so that transversely-emitted gamma radiation leaving the bottom of the sample is permitted to reach an adjacent scintillator crystal.

BRIEF DESCRIPTION OF THE DRAWINGS

Other objects and advantages of the invention will become apparent from the following detailed description and upon reference to the drawings, in which:

FIG. 3 is a sectional view, taken along plane 3—3 of FIG. 2, depicting the internal construction of the scintillation counter shield assembly;

FIG. 4 is a sectional view, taken along plane 4—4, of the radiation shield, and also illustrating, in phantom, the horizontal displacement of components of the segments to provide access to the photomultiplier tube assembly;

FIG. 5 is a perspective of an elevator extension platform employed to maximize the detecting efficiency of the scintillation counter;

FIG. 6 is a sectional view, taken along plane 6—6 of FIG. 5, of the elevator;

FIG. 7 is a sectional view of the elevator of FIG. 5, taken along plane 7—7 of FIG. 6;

FIG. 8 is a front sectional view of a scintillation crystal assembly including provisions for aligning a photomultiplier tube assembly, including a sample counting zone, with sample transporting assemblies;

FIG. 9 is a top partial enlarged view of the scintillation crystal assembly of FIG. 8, taken along plane 9—9 of FIG. 8;

FIG. 10 is a partial sectional view of the scintillation crystal assembly of FIG. 8, taken along plane 10—10 of FIG. 9;

FIG. 11 is a partial front sectional view of a sample counting zone, with sample and elevator in place, for counting gamma ray photons under conditions maximizing the gamma detecting efficiency of the scintillation counter; and FIG. 12 is an exploded view of the radiation shield of FIGS. 1–4, and showing the arrangement of the elevator extension platform of FIGS. 5–7 and the scintillation crystal assembly of FIGS. 8–11.

Figure 1:
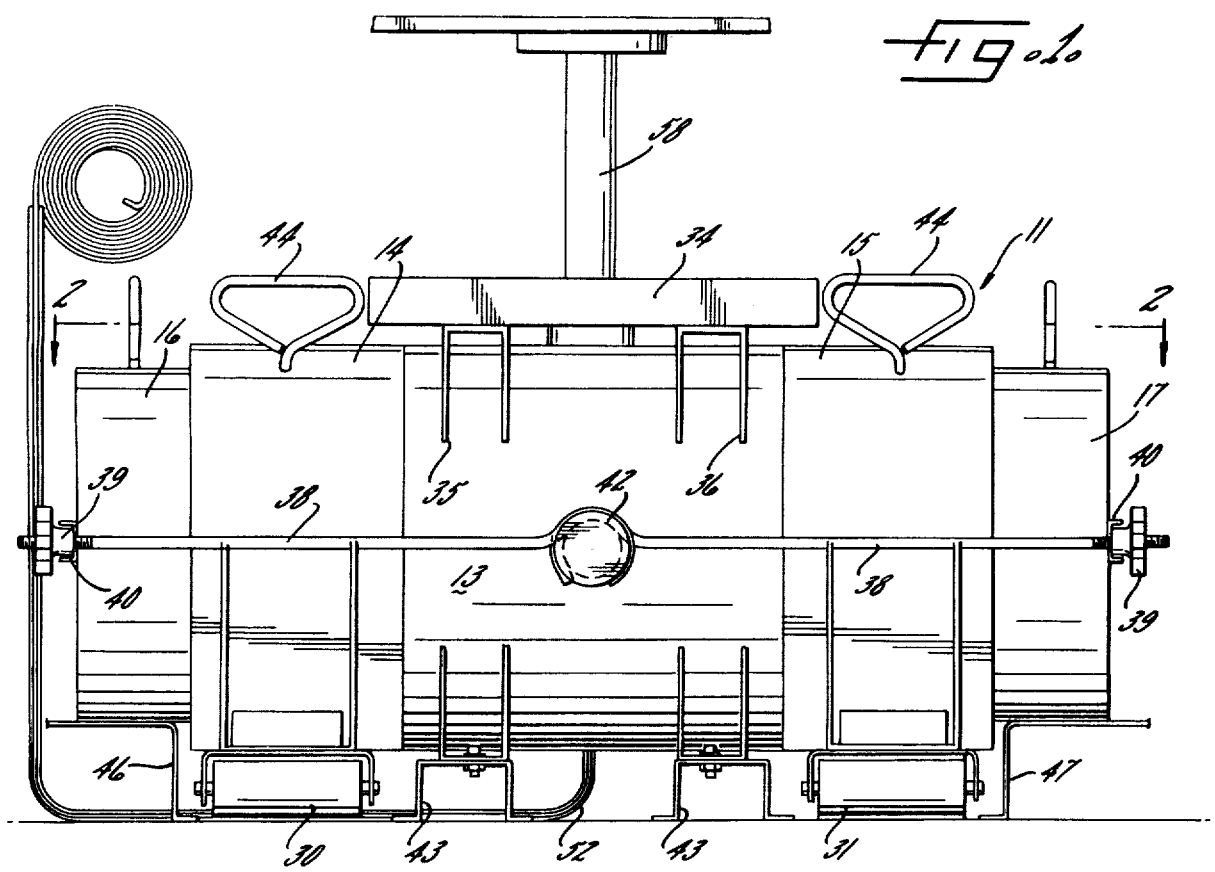
FIG. 1 is a front elevation view showing an assembled shield or pig for containing a sample being simultaneously observed by two photomultiplier tubes.
Figure 2:
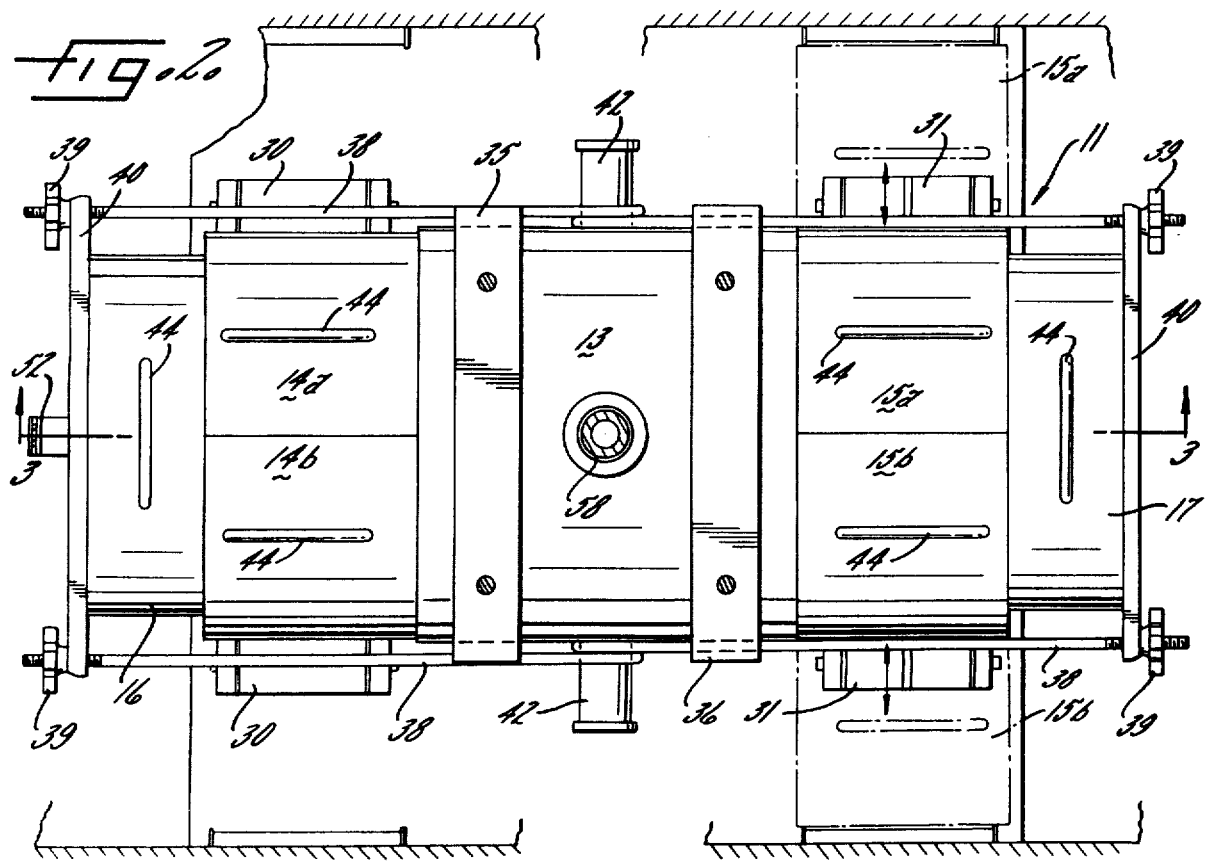
FIG. 2 is a top view of the shield depicted in FIG. 1, the view being taken along plane 2—2 of FIG. 1.
Figure 16:
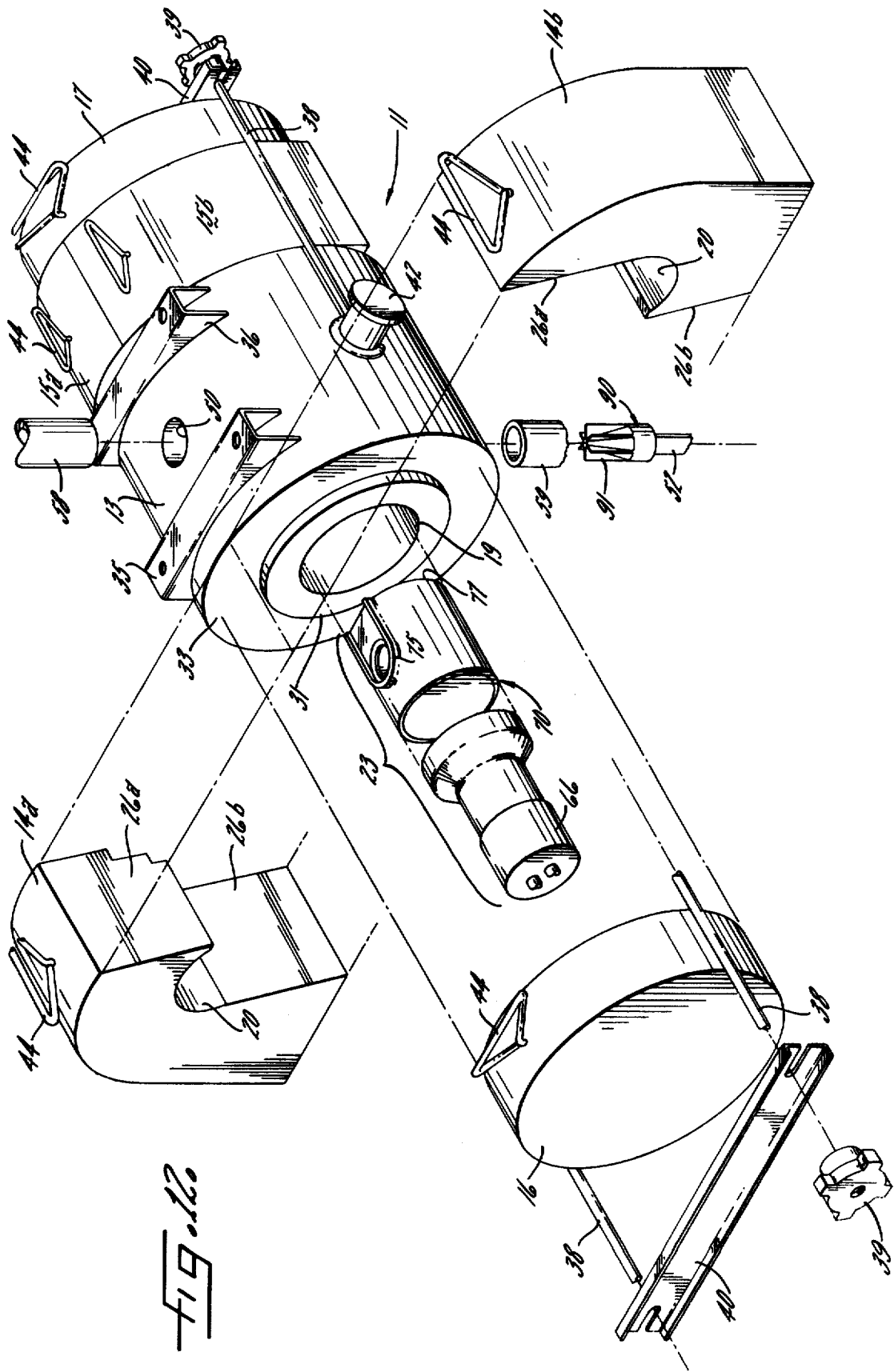

While the invention will be described in connection with a preferred embodiment, the reader will understand that it is not intended to limit the invention to that embodiment or to the specific combination with other components. On the contrary, it is intended to cover all alternatives, modifications, and equivalents as may be included within the spirit and scope of the invention as defined by the appended claims.

DETAILED DESCRIPTION OF PREFERRED EMBODIMENT

The radiation shield assembly of a scintillation counter particularly suited for gamma detection is depicted in FIGS. 1 through 4 and, in an exploded view, in FIG. 12. In the particular shield assembly shown, two photomultiplier tube assemblies, including two crystals, are employed to increase resolution and efficiency of a flow through crystal design.

As shown in these figures, the lead radiation shield, indicated generally at 11, is of generally cylindrical overall shape. The shield 11 includes a central cylindrical segment 13, a pair of intermediate segments 14, 15 on opposite ends of the central segment 13, and a pair of end cap segments 16, 17 at the ends of the intermediate segments 14, 15 respectively. An axial cylindrical bore 19 (FIGS. 3, 12) extends through the segment 13, and is coaxial with similar cylindrical bores 20, 21 FIGS. 3, 12) through the intermediate segments 14, 15, respectively, to receive a pair of photomultiplier tube assemblies 23, 24 (FIGS. 3, 12), to be described presently.

As best shown in FIGS. 4 and 12, the intermediate segments 14, 15 are each made in two parts. The longitudinal division or parting planes 26 which define the parting surfaces between the segments 14a, 14b are so shaped as to obstruct the passage of nuclear radiation, which travels along a straight line, from entering a sample receiving zone 28 (FIGS. 3, 11) where a sample is placed for scintillation counting or from contacting the scintillator crystals and other components of this photomultiplier assembly.

Various surfaces are available for avoiding straight-line transmission, but the most effective and yet simplest is obtained by making the parting planes 26 in the form of two parallel planes 26a, 26b, each parallel to the axis of the bore 20, but tangent to this bore. Consequently, radiation which could travel between the parting surfaces has no opportunity to enter the sample receiving zone 28 by reason of the geometric relationship between the tangential lines 26a, 26b and the bore into which the planes extend.

By the same token, dividing the intermediate segment 14 into two half-segments 14a, 14b, permits the halves to be moved radially and horizontally away from the assembled shield 13, as shown in FIG. 4. Rollers 30, 31 (FIG. 1) permit the segments 14a, 14b to be rolled out of the way along horizontal paths without disturbing the central segment 13 which surrounds the sample receiving zone 28.

To prevent straight-line access of radiation through the parting planes 33, 34 between the central segment 13 and the intermediate segments 14, 15, one of the surfaces is provided with a protruding collar 31 which mates with a generally conforming recess 32 on the opposite segment. Advantageously the collar 31 is on the sample-zone-surrounding segment 13, as shown in FIGS. 3, 12, to permit disassembly of the two portions of the intermediate segment merely by radial displacement without requiring any axial displacement as would be the case if the protruding collar 31 were on the intermediate segments 14, 15.

At the ends of the shield 11, a pair of end caps 16, 17 (FIGS. 1, 2, 3, 12) are employed to terminate the shield assembly. These caps 16, 17 are generally flat cylindrical discs, approximately as thick as the wall thickness of the segments 13, 14, 15. To permit external electrical communication with the photomultiplier tube assemblies 23, 24, the segments 14, 14a have a groove positioned within a plane such that any radioactivity passing through this opening will not cause any increase in background. These are omitted from the drawings.

As an additional obstruction to cosmic radiation, a rectangular lead plate 34 is mounted above the sample-zone-surrounding segment 13 and is supported on a set of brackets 35, 36. This plate is ordinarily not removed from the central segment 13 during either assembly or use of the sheild 11.

All segments of the sheild assembly 11 are held together with a series of four hooks 38, threaded at their straight ends, and corresponding eye bolts 39 which abut against tie bars 40. The hooked portions removably engage a pair of horizontal bosses 42 (FIGS. 2, 12), permitting the intermediate segments 14, 15 and the end cap segments 16, 17 to be movable while the central segment 13 remains fixed in place on its weldment base 43 (FIGS. 1, 3). Handles 44 on each of the intermediate segments 14a, 14b, 15a, 15b and on the end cap segments 16, 17 (FIGS. 1, 2, 3, 12) permit either manual or hoist-operated vertical movement of these respective segments to facilitate (in the case of the intermediate segments) radial outward movement and (in the case of the end cap segments 16, 17) axial outward movement along their respective rollers 30, 31 and support plates 46, 47 (FIG. 1).

In the shield assembly 11 depicted in the drawings, two photomultiplier tube assemblies 23, 24 (FIG. 3) are used. However, for many applications only a single photomultiplier tube assembly is required, and in this event the shield assembly may be simplified. For example, only one set of intermediate segments 14a, 14b or 15a, 15b is required, as is only one end cap 16 or 17. However, the central segment 13 in this case has a bore 19 extending only part way through the central segment, and the end of the segment opposite the bore serves to exclude radiation from the shield end opposite that of the end cap. In other words, the central segment 13, instead of being a hollow cylinder as shown in FIG. 3, is a cup-shaped structure with the bore 19 extending from one side to only just beyond the sample-receiving zone.

As indicated in FIG. 3, and partially in FIGS. 1 and 12, samples are transmitted or conducted into the sample receiving zone 28 (FIG. 11) within the shield 11 via a sample-conducting bore 50 extending vertically upward from the zone 28 through the central segment 13 and the plate 34. A similar bore 51 (FIGS. 3, 11) extends from the sample receiving zone 28 through the bottom of the central segment 13 to receive a sample conducting elevator assembly. This assembly, which is described more fully in Frank application Ser. No. 241,987, filed Apr. 7, 1972 and entitled "Elevator Mechanism for Scintillation Detectors and the Like," includes a flexible elevator band 52 (FIGS. 1, 3, 5, 11, 12) passing through a guide 53 to an elevator drive, not shown, which raises or lowers the band 52 to raise or lower a sample bottle 55 (FIG. 11) into the sample receiving zone 28.

As best shown in FIGS. 3 and 11, the bores 50, 51 may include thin but hard metal tubular bushings 56, 57 to prevent wear on the tubes 50, 51 and, optimally, also have a dual-functioning pair of a sample-conducting tube 58 and an elevator tube 59. These latter tubes are slidable in the sample-conducting bore 50 and the elevator bore 51, respectively, and not only insure against bore wear throughout numerous sample load-count-unload cycles, but serve to align the photomultiplier tube assemblies 23, 24 (FIG. 3). In common with most photomultiplier tube assemblies, the assemblies 23, 24 shown in FIG. 3, each includes a photomultiplier tube such as the tube 60 having a frustro conical portion 61 with its broad portion 63 facing toward a scintillator crystal 64 and toward the sample receiving zone 28, the narrower face of the frusto conical portion facing away from the sample receiving zone 28 and toward a photomultiplier tube socket 66. Penetrating radiation from a sample (55 in FIG. 11) interacts with the material in the scintillator crystal 64, where it is converted to light flashes which are detected by the photomultiplier tube 60 and converted into electrical signals transmitted via the photomultiplier tube socket 66.

Photomultiplier tube assemblies of this type, however, are difficult to position and align with respect to a sample conducting bore 50 and/or with respect to an elevator bore 51. To accommodate slightly different sizes of tube assemblies 23, 24, which occur normally as manufacturing tolerances, the tube assemblies 23, 24 are conventionally at least slightly rotatable and moveable longitudinally in the central cylindrical bore 19. Where access to the perpendicular intersection of the bores 50, 51 with the axial bore 19 is prevented, as necessarily occurs in a radiation shield 11 such as that depicted in the drawing, precise alignment is difficult in the absence of special measures.

According to a further aspect of the scintillation counter described herein, the photomultiplier tube assemblies 23, 24 are so shaped as to insure precise registry with the bores 50, 51.

Directing attention to FIGS. 8 through 12, the photomultiplier tube assembly includes a scintillation crystal assembly 70 which contains within a metallic housing 71 a cylindrical scintillator crystal 64, a pair of terminal light-transmissive windows 72, 73, and a central bore, perpendicular to the scintillator crystal 64, which defines the sample receiving zone 28 (FIG. 11). The assembly 70 also includes a pair of bosses 75, 76, respectively at the top and bottom surfaces, which are machined so as to have flat horizontal upper and lower surfaces 77, 78 and stop portions 79, 80. When the scintillator crystal assembly 70 is placed within the axial bore 19 (FIGS. 3, 12) of the central segment 13, careful lowering of the sample conducting tube 58 to a predetermined position, and careful raising of the elevator tube 59, assures that the flat ends of the respective tubes will insure angular alignment of the scintillator crystal assembly 70 (and consequently the entire photomultiplier tube assembly 23, 24), while abutment of the stop portions 79, 80 with the tubes 58, 59 (FIG. 3) insures longitudinal alignment of the scintillator crystal assembly 70. After adjustment, the assemblies 23, 24 are locked in position by tightening the gaskets 100.

A highly advantageous scintillator crystal assembly is depicted in FIGS. 8-11 and includes the previously-described cylindrical crystal 64 and the terminal windows 72, 73. Scintillator crystals made of such materials as the organic compounds anthracene, napthalene, chrysens, stilbene, or the like, or inorganic materials such as calcium tungstate (scheelite) or the alkali halides, with optional dopants, are well known. The crystal 64 is contained within a generally cylindrical aluminum can 81, and is provided with a gamma-transmissive but light reflective alumina or magnesia coating 82 around the cylindrical surfaces of the crystal 64 cylinder and around the sample receiving zone or central cylindrical bore 28 (FIG. 8). The windows 72, 73 are of course light transmissive to permit the light scintillations to be observed by the photomultiplier tubes 60 (FIG. 3).

An improved elevator extension platform, which is best shown in FIGS. 5 through 7, FIG. 11, and FIG. 12, is designed to maximize the detecting efficiency of the scintillation counter by providing a maximum aspect, or field of view, for the scintillator crystal assembly. If the photomultipliers were to observe only the cylindrical sides of a sample container 55 (FIG. 11), gamma rays emitted from the top and the bottom of the container 55 would have no access to the scintillator crystal. Accordingly, these rays could not be counted, with the result that counting efficiency would be rather low.

An additional feature is to have the minimum amount of absorbiing media between the radioactive sample being analyzed and the scintillator crystal, and also as close to 4-Pi counting geometry as possible. In many applications, the radioactive material is of very small volume, covering only the bottom of the test vial. The elevator stopping or counting position is remotely adjusted to position the center of radioactivity close to the center of the crystal. It can be readily seen that for a sample of very small volume the optimum counting position is with the elevator platform stopping at near midpoint. Also it is readily seen that this elevator design allows more energy to strike the scintillating crystal.

As a partial remedy of this, the sample receiving zone 28 is made substantially longer than the effective vertical height of the sample 55. Then, an elevator extension platform 90 (FIG. 5) is secured to the flexible elevator band or ribbon 52 so as to position the sample 55 above the bottom of the sample receiving zone. The extension is provided by a plurality of thin vertical sample-supporting members 91 to permit gamma radiation emitted transversely from the bottom of the sample 55 to reach the scintillator crystal 64 (FIG. 11). The thin members 91 offer minimal interference with transmission of gamma ray photons and, if made of a stiff plastic such as polypropylene are capable alone, or in combination with a conical central portion 92, of supporting the sample 55. The conical portion 92, as will be observed from FIG. 11, similarly offers little geometric interference to gamma rays. The bottom of the conical portion 92 terminates in a cylinder 93, having a web 94 which is pinned to the elevator band 52.

Thus it is apparent that there has been provided, according to the invention, a scintillation counter that fully satisfies the objectives recited above.

I claim:

1. In a scintillation counter for detecting and measuring the gamma activity of a sample, including
   a vertical sample receiving zone within a massive lead radiation shield,
   a scintillator crystal in gamma-transmissive relation with said sample receiving zone,
   at least one photomultiplier tube in light-transmissive relation with said scintillator crystal,
   a vertical bore extending upwardly through said shield to said sample receiving zone, and
   an elevator in said vertical bore for transferring said sample into and out of said sample receiving zone,
   the improvement whereby the gamma detecting efficiency of said counter is maximized, comprising:
   a sample receiving zone substantially longer than said sample, and
   an upstanding elevator extension platform having a plurality of thin vertical sample-supporting members to position said sample above the bottom of the sample receiving zone, so that transversely-emitted gamma radiation leaving the bottom of said sample is permitted to reach said scintillator crystal.

2. Combination of claim 1 wherein said members are radial fins.

3. Combination of claim 1 wherein said elevator extension platform includes a central conical portion.

* * * * *